US011476525B2

(12) United States Patent
Lee

(10) Patent No.: US 11,476,525 B2
(45) Date of Patent: Oct. 18, 2022

(54) RECHARGEABLE BATTERY

(71) Applicant: SAMSUNG SDI CO., LTD., Yongin-si (KR)

(72) Inventor: Hyunsoo Lee, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 895 days.

(21) Appl. No.: 16/312,989

(22) PCT Filed: Jun. 19, 2017

(86) PCT No.: PCT/KR2017/006417
§ 371 (c)(1),
(2) Date: Dec. 21, 2018

(87) PCT Pub. No.: WO2017/222261
PCT Pub. Date: Dec. 28, 2017

(65) Prior Publication Data
US 2019/0229306 A1    Jul. 25, 2019

(30) Foreign Application Priority Data

Jun. 24, 2016    (KR) ................ 10-2016-0079650

(51) Int. Cl.
*H01M 50/14*    (2021.01)
*H01M 50/54*    (2021.01)
(Continued)

(52) U.S. Cl.
CPC ....... *H01M 50/147* (2021.01); *H01M 50/172* (2021.01); *H01M 50/531* (2021.01); *H01M 50/543* (2021.01)

(58) Field of Classification Search
CPC ............. H01M 50/147; H01M 50/531; H01M 50/543; H01M 50/172
See application file for complete search history.

(56) References Cited

U.S. PATENT DOCUMENTS

2009/0004559 A1*   1/2009   Gardner .............. H01M 50/538
                                                                                                219/121.64
2010/0232907 A1    9/2010   Jokisch
(Continued)

FOREIGN PATENT DOCUMENTS

CN    101512167 A    8/2009
CN    102054958 A    5/2011
(Continued)

OTHER PUBLICATIONS

Office Action in corresponding Chinese Application No. 201780035603.7, Chinese Office Action dated Oct. 28, 2021, with English Translation (17 pgs.).
(Continued)

*Primary Examiner* — Ula C Ruddock
*Assistant Examiner* — Frank A Chernow
(74) *Attorney, Agent, or Firm* — Lewis Roca Rothgerber Christie LLP

(57) ABSTRACT

A rechargeable battery according to an exemplary embodiment of the present invention includes: an electrode assembly which is charged with an electric current and discharged; a casing which accommodates therein the electrode assembly; a cap plate which is coupled to an opening of the casing; and an electrode terminal which is electrically connected to the electrode assembly and installed in a terminal hole of the cap plate, the electrode terminal including: a plate terminal which is disposed outside the cap plate and has a coupling hole; and a rivet terminal which is installed in the terminal hole and coupled to the coupling hole, and the plate terminal and the rivet terminal include torque resistance increasing portions which are formed at a coupling interface between the coupling hole and the rivet terminal and increase torque resistive force of the plate terminal with respect to a z-axis of the rivet terminal.

12 Claims, 10 Drawing Sheets

(51) Int. Cl.
    *H01M 50/147*     (2021.01)
    *H01M 50/172*     (2021.01)
    *H01M 50/531*     (2021.01)
    *H01M 50/543*     (2021.01)

(56) References Cited

U.S. PATENT DOCUMENTS

| | | |
|---|---|---|
| 2010/0323234 A1 | 12/2010 | Kim et al. |
| 2011/0070466 A1 | 3/2011 | Park et al. |
| 2011/0104561 A1 | 5/2011 | Kim et al. |
| 2011/0300435 A1 | 12/2011 | Byun |
| 2011/0305929 A1 | 12/2011 | Byun |
| 2012/0214053 A1 | 8/2012 | Kim |
| 2012/0225348 A1 | 9/2012 | Kim |
| 2013/0011703 A1 | 1/2013 | Kim et al. |
| 2013/0071726 A1 | 3/2013 | Kim |
| 2014/0147736 A1 | 5/2014 | You et al. |
| 2016/0093866 A1 | 3/2016 | Lee |
| 2016/0099455 A1 | 4/2016 | Tonari |

FOREIGN PATENT DOCUMENTS

| | | |
|---|---|---|
| CN | 102280596 A | 12/2011 |
| CN | 102646808 A | 8/2012 |
| CN | 102867933 A | 1/2013 |
| CN | 103840115 A | 6/2014 |
| DE | 10 2015 219 254 A1 | 4/2016 |
| JP | 11-132214 A | 5/1999 |
| JP | 2003-257410 A | 9/2003 |
| JP | 2009-37817 A | 2/2009 |
| JP | 2013-161518 A | 8/2013 |
| KR | 10-2009-0045946 A | 5/2009 |
| KR | 10-2009-0053637 A | 5/2009 |
| KR | 10-2011-0133257 A | 12/2011 |
| KR | 10-1223517 B1 | 1/2013 |
| KR | 10-2015-0119994 A | 10/2015 |
| KR | 10-2016-0038582 A | 4/2016 |

OTHER PUBLICATIONS

Office Action in corresponding European Application No. 17815674.1, European Office Action dated Oct. 27, 2021 (5 pgs.).
Chinese Office Action from corresponding Chinese Patent Application No. 201780035603.7, Chinese Office Action dated Nov. 18, 2020 (21 pgs. with English translation).
EPO Extended Search Report dated Nov. 6, 2019, for corresponding European Patent Application No. 17815674.1 (7 pages).
Chinese Office Action from corresponding Chinese Patent Application No. 201780035603.7, Chinese Office Action dated May 19, 2021 (21 pgs. with English translation).

\* cited by examiner

[Figure 1]

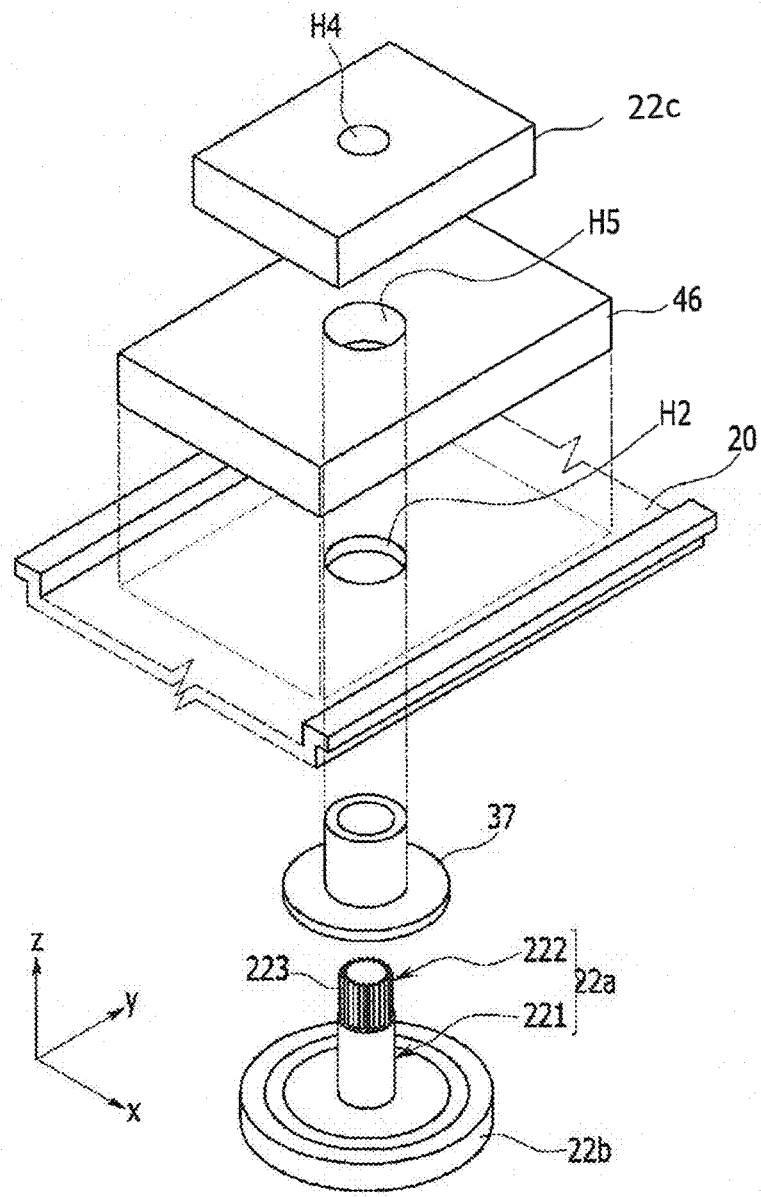
[Figure 3]

【Figure 4】
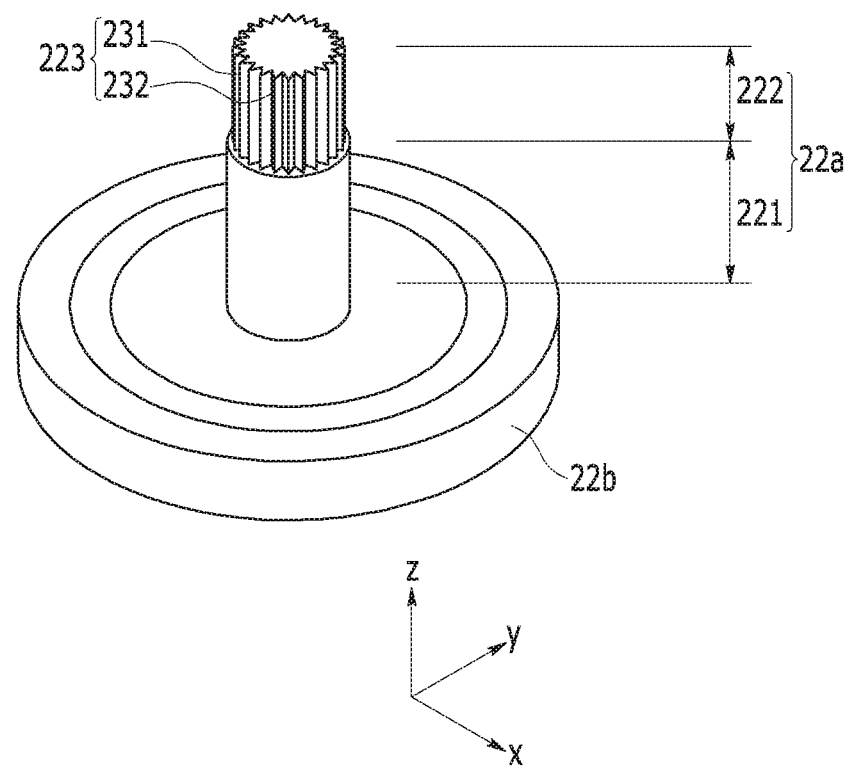

【Figure 5】
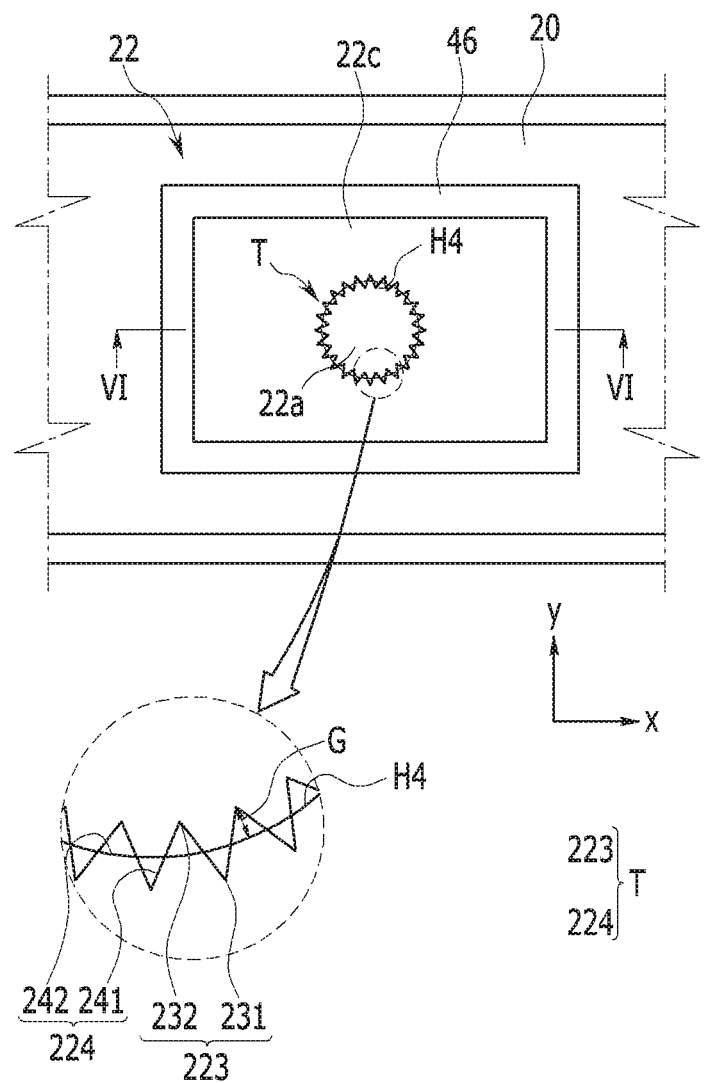

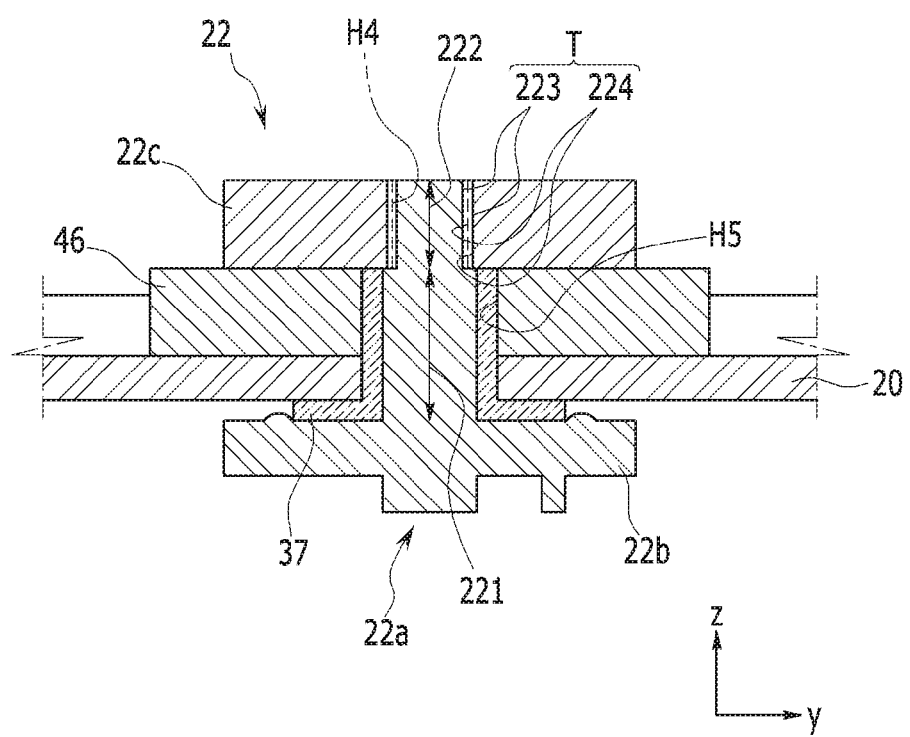
[Figure 6]

[Figure 7]
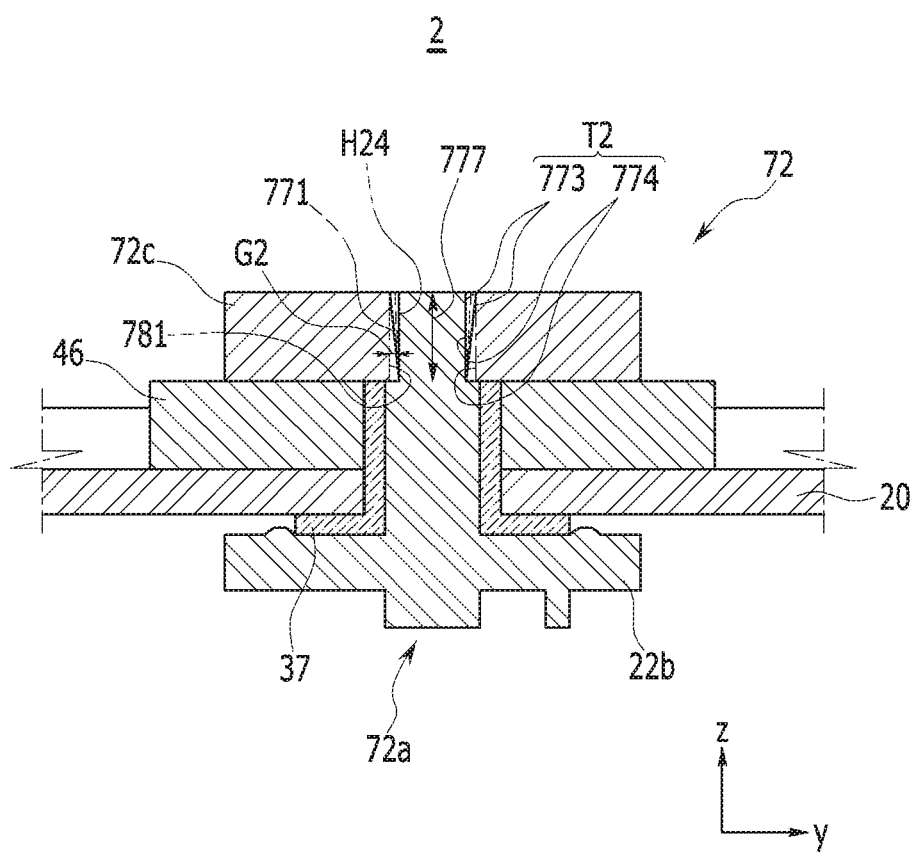

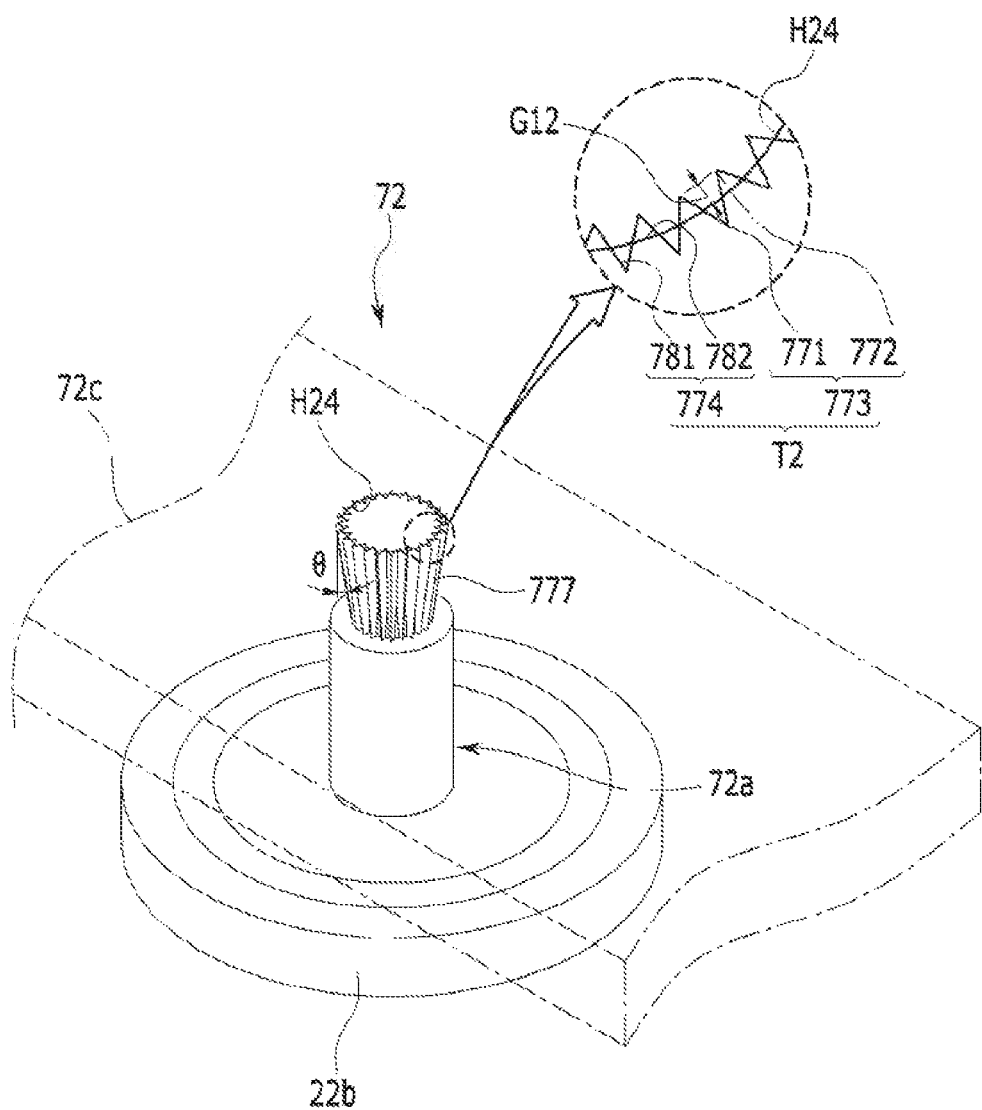
[Figure 8]

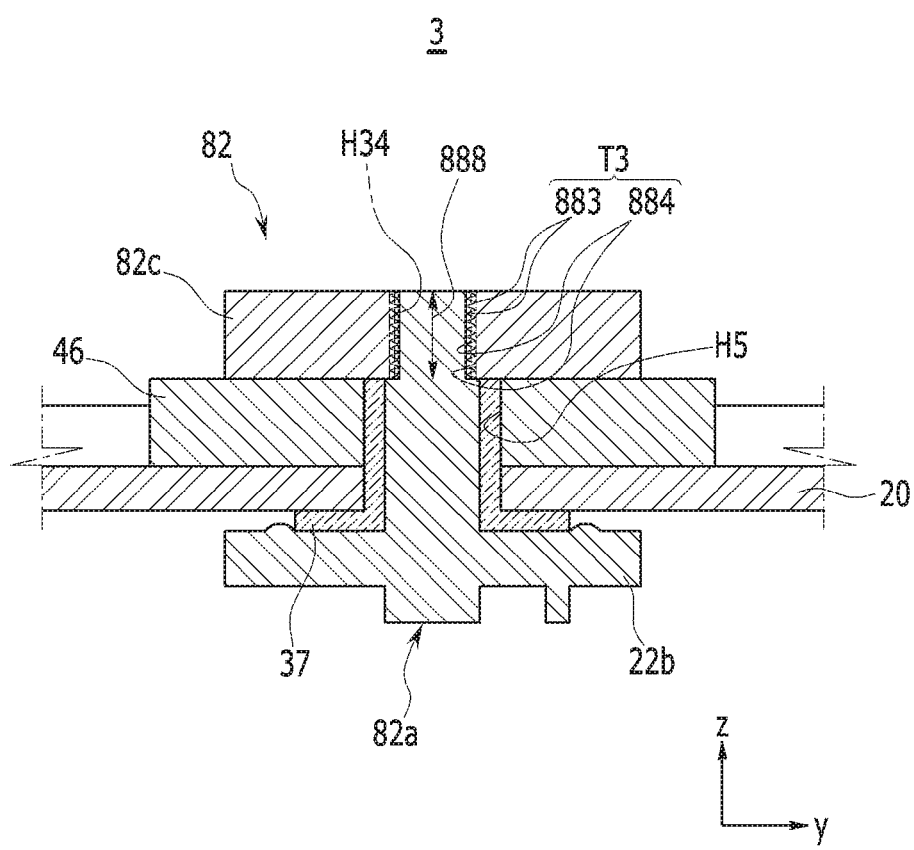
[Figure 9]

【Figure 10】
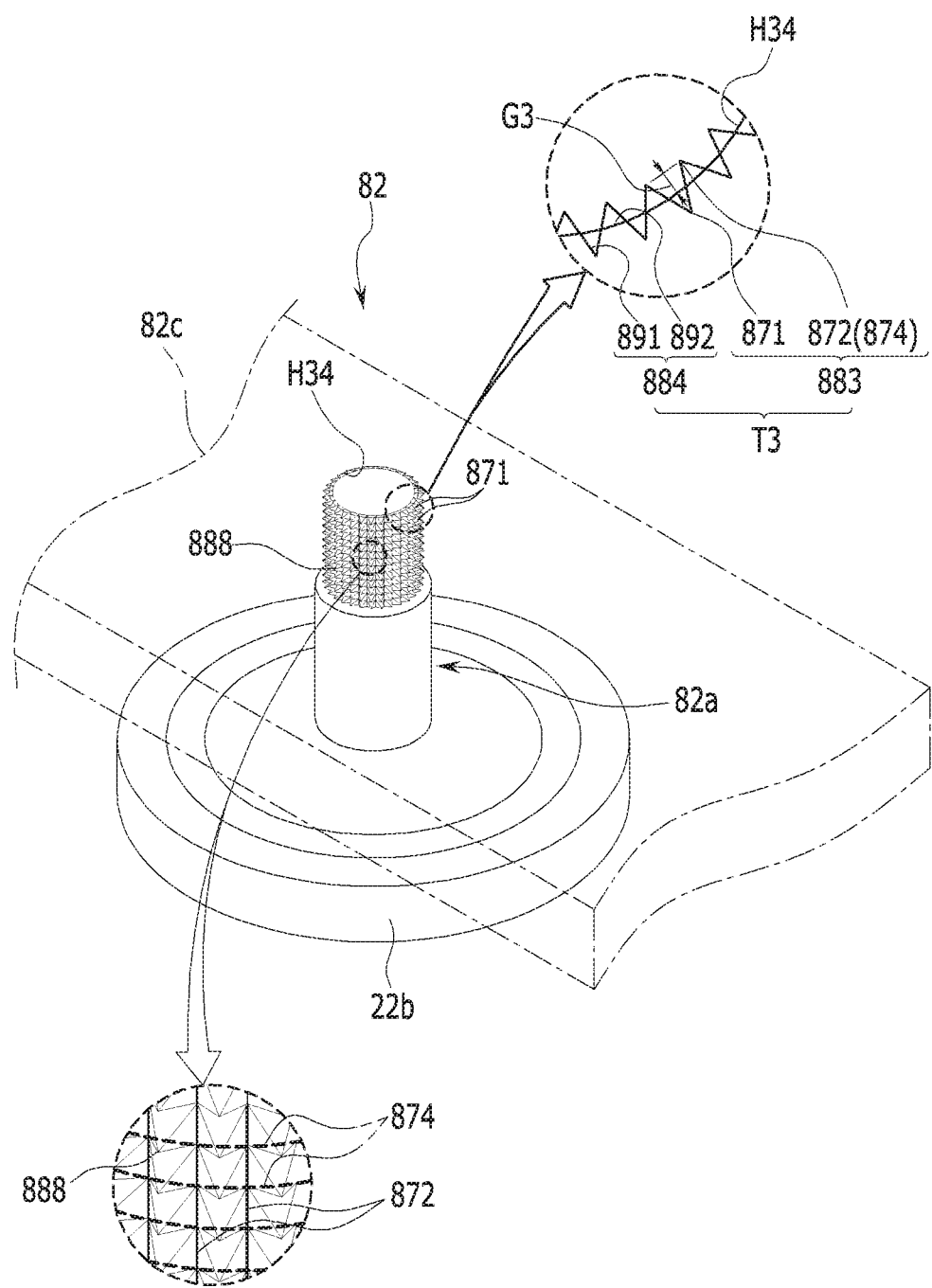

RECHARGEABLE BATTERY

CROSS-REFERENCE TO RELATED APPLICATION(S)

This application is a National Phase Patent Applications and claims priority to and the benefit of International Application Number PCT/KR2017/006417, filed on Jun. 19, 2017, which claims priority to and the benefit of Korean Patent Application No. 10-2016-0079650, filed on Jun. 24, 2016, the entire contents of each of which are incorporated herein by reference.

TECHNICAL FIELD

The present disclosure relates to a rechargeable battery, and more particularly, to a rechargeable battery having an electrode terminal formed by coupling a rivet terminal to a plate terminal.

BACKGROUND

In contrast to a primary battery, a rechargeable battery is repeatedly charged and discharged. A low-capacity rechargeable battery may be used for a small-sized portable electronic device such as a mobile phone, a notebook computer, and a camcorder, and a high-capacity rechargeable battery may be used as a power source for operating a motor in a hybrid vehicle and an electric vehicle.

The rechargeable battery may include a single cell and be used for a small-sized electronic device. Alternatively, the rechargeable battery may be configured in the form of a pack in which multiple modules having electrically connected multiple cells are electrically connected to one another, and the rechargeable battery may be used to operate a motor.

The rechargeable battery includes a casing which accommodates therein an electrode assembly which is charged with an electric current and discharged, a cap plate which is coupled to an opening of the casing, and electrode terminals which are electrically connected to the electrode assembly and installed in terminal holes of the cap plate.

The electrode terminal includes a rivet terminal which is disposed inside the cap plate, connected to the electrode assembly, and installed in the terminal hole, and a plate terminal which is disposed outside the cap plate and connected to the rivet terminal.

The rivet terminal is inserted into the coupling hole of the plate terminal and connected to the plate terminal by riveting or welding. In this case, an outer surface of the rivet terminal and the coupling hole of the plate terminal are formed in planar forms and in surface-to-surface contact with each other.

Therefore, the plate terminal has low frictional force against torque being applied about a z-axis of the rivet terminal, such that electrical contact resistance is increased due to an insufficient contact area, and thermal deformation caused by a thermal shock cannot be inhibited, and as a result, electrical resistance dispersion may be increased.

SUMMARY

The present invention has been made in an effort to provide a rechargeable battery that increases torque resistive force of a plate terminal with respect to a z-axis of a rivet terminal. The present invention has also been made in an effort to provide a rechargeable battery that reduces electrical contact resistance by increasing a contact area between a plate terminal and a rivet terminal and reduces electrical resistance dispersion by inhibiting thermal deformation caused by a thermal shock.

An exemplary embodiment of the present invention provides a rechargeable battery including: an electrode assembly which is chargeable with an electric current and dischargeable; a casing which accommodates therein the electrode assembly; a cap plate which is coupled to an opening of the casing; and an electrode terminal which is electrically connected to the electrode assembly and installed in a terminal hole of the cap plate, in which the electrode terminal includes: a plate terminal which is disposed outside the cap plate and has a coupling hole; and a rivet terminal which is installed in the terminal hole and coupled to the coupling hole, and the plate terminal and the rivet terminal include torque resistive force increasing portions which are formed at a coupling interface between the coupling hole and the rivet terminal and increase torque resistive force of the plate terminal with respect to a z-axis of the rivet terminal.

The rivet terminal may include: a first corresponding portion which is coupled, in an insulated state, to the terminal hole with a gasket interposed therebetween; and a second corresponding portion which is connected to the first corresponding portion in the z-axis direction and coupled, in a conductive state, to the coupling hole.

The torque resistance increasing portions may include: a knurled portion which is formed on an outer surface of the second corresponding portion; and a deformed portion which is formed on an inner surface of the coupling hole so as to correspond to the knurled portion of the second corresponding portion.

The knurled portion may include crests and troughs which are repeatedly disposed on an outer circumferential surface of the second corresponding portion in a circumferential direction and extend in the z-axis direction.

The deformed portion may include deformed troughs and deformed crests which are deformed corresponding to the crests and the troughs of the knurled portion, are repeatedly deformed and disposed on an inner surface of the coupling hole in the circumferential direction, and extend in the z-axis direction.

The second corresponding portion may have a constant diameter in the entire region in the z-axis direction.

The second corresponding portion may have a minimum diameter at an inner side thereof in the z-axis direction, the diameter of the second corresponding portion may be gradually increased outward, and the second corresponding portion may have a maximum diameter at an outer side thereof.

The knurled portion may include: first troughs which are repeatedly disposed on an outer circumferential surface of the second corresponding portion in a circumferential direction and extend in the z-axis direction; second troughs which are repeatedly disposed on the outer circumferential surface of the second corresponding portion in the z-axis direction and formed in the circumferential direction, and intersect the first troughs; and protrusions which are formed between the first troughs and the second troughs.

The deformed portion may include: deformed troughs which are deformed corresponding to the protrusions, the first troughs, and the second troughs of the knurled portion, repeatedly deformed and disposed on an inner surface of the coupling hole in the circumferential direction, formed to extend in the z-axis direction, repeatedly deformed and disposed in the z-axis direction and formed in the circumferential direction; and deformed crests which are formed between the deformed troughs that intersect one another.

The second corresponding portion may have a constant diameter in the entire region in the z-axis direction.

The protrusions may be formed as multiple quadrangular pyramids on the outer surface of the second corresponding portion by the first troughs and the second troughs that intersect the first troughs.

Strength of the rivet terminal may be higher than strength of the plate terminal.

According to the exemplary embodiment of the present invention, since the torque resistance increasing portions are provided at the coupling interface between the coupling hole of the plate terminal and the rivet terminal, it is possible to increase torque resistive force of the plate terminal with respect to the z-axis of the rivet terminal. That is, coupling force between the rivet terminal and the plate terminal may be increased.

Since the torque resistance increasing portions increase the contact area between the plate terminal and the rivet terminal which are coupled to each other, it is possible to reduce electrical contact resistance. In addition, since the torque resistance increasing portions increase the contact area between the plate terminal and the rivet terminal, thermal deformation caused by a thermal shock is inhibited, and as a result, it is possible to reduce electrical resistance dispersion.

BRIEF DESCRIPTION OF THE DRAWINGS

FIG. 3 is an exploded perspective view of an electrode terminal of the rechargeable battery in FIG. 1.

FIG. 4 is a perspective view of a rivet terminal of the electrode terminal in FIG. 3.

FIG. 5 is a top plan view of the assembled electrode terminal in FIG. 3.

FIG. 6 is a cross-sectional view taken along line VI-VI in FIG. 5.

FIG. 7 is a cross-sectional view of an electrode terminal of a rechargeable battery according to a second exemplary embodiment of the present invention.

FIG. 8 is a perspective view of a rivet terminal of the electrode terminal in FIG. 7.

FIG. 9 is a cross-sectional view of an electrode terminal of a rechargeable battery according to a third exemplary embodiment of the present invention.

FIG. 10 is a perspective view of a rivet terminal of the electrode terminal in FIG. 9.

DETAILED DESCRIPTION

Figure 1:
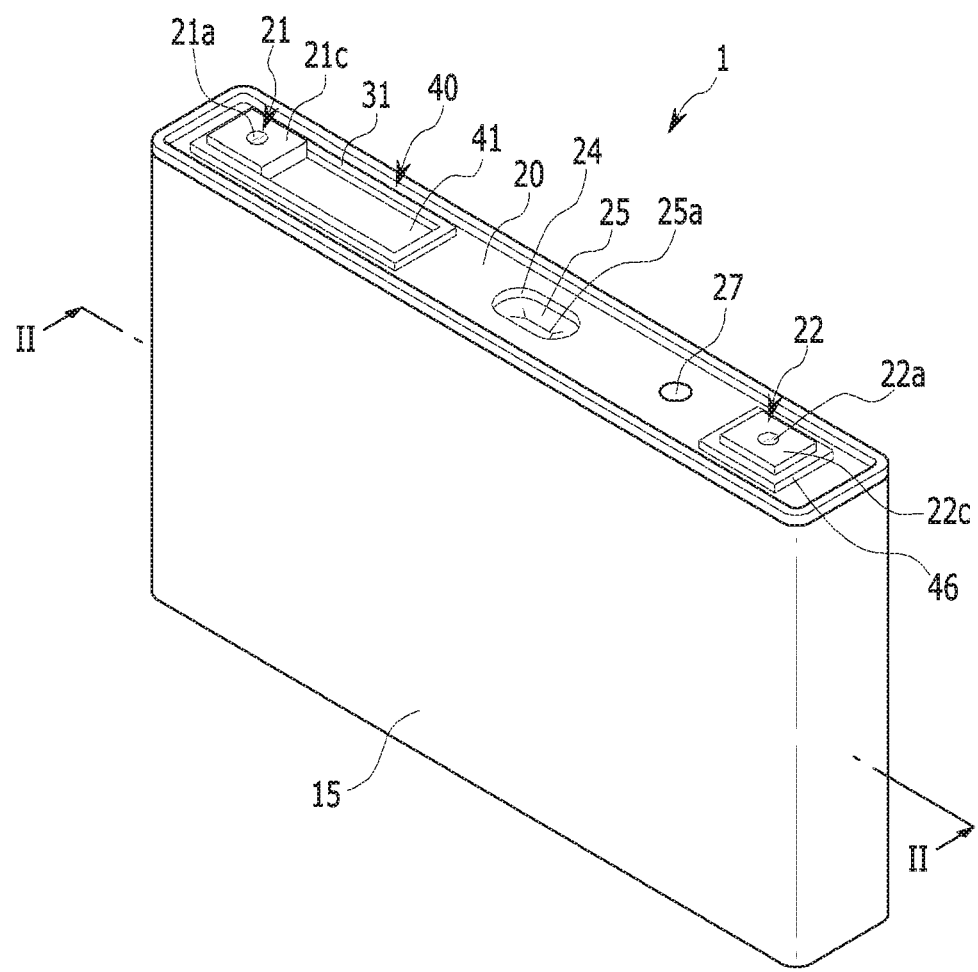
FIG. 1 is a perspective view of a rechargeable battery according to a first exemplary embodiment of the present invention.

Hereinafter, some exemplary embodiments of the present invention will be described in further detail with reference to the accompanying drawings so that those skilled in the technical field to which the present invention pertains may easily carry out the exemplary embodiments. As those skilled in the art would realize, the described embodiments may be modified in various different ways, all without departing from the scope of the present invention.

The drawings and description are to be regarded as illustrative in nature and not restrictive. Like reference numerals designate like elements throughout the specification.

Throughout this specification and the claims, when one constituent element is referred to as being "directly connected to" another constituent element, one constituent element can be directly connected to the other constituent element, and one constituent element can also be "indirectly connected to" the other element with one or more other elements therebetween. In addition, unless otherwise described, the word "comprise" and variations such as "comprises" or "comprising" will be understood to imply the inclusion of stated elements, not the exclusion of any other elements.

In addition, each configuration illustrated in the drawings may be arbitrarily shown for understanding and ease of description, but the present invention is not limited thereto.

Figure 2:
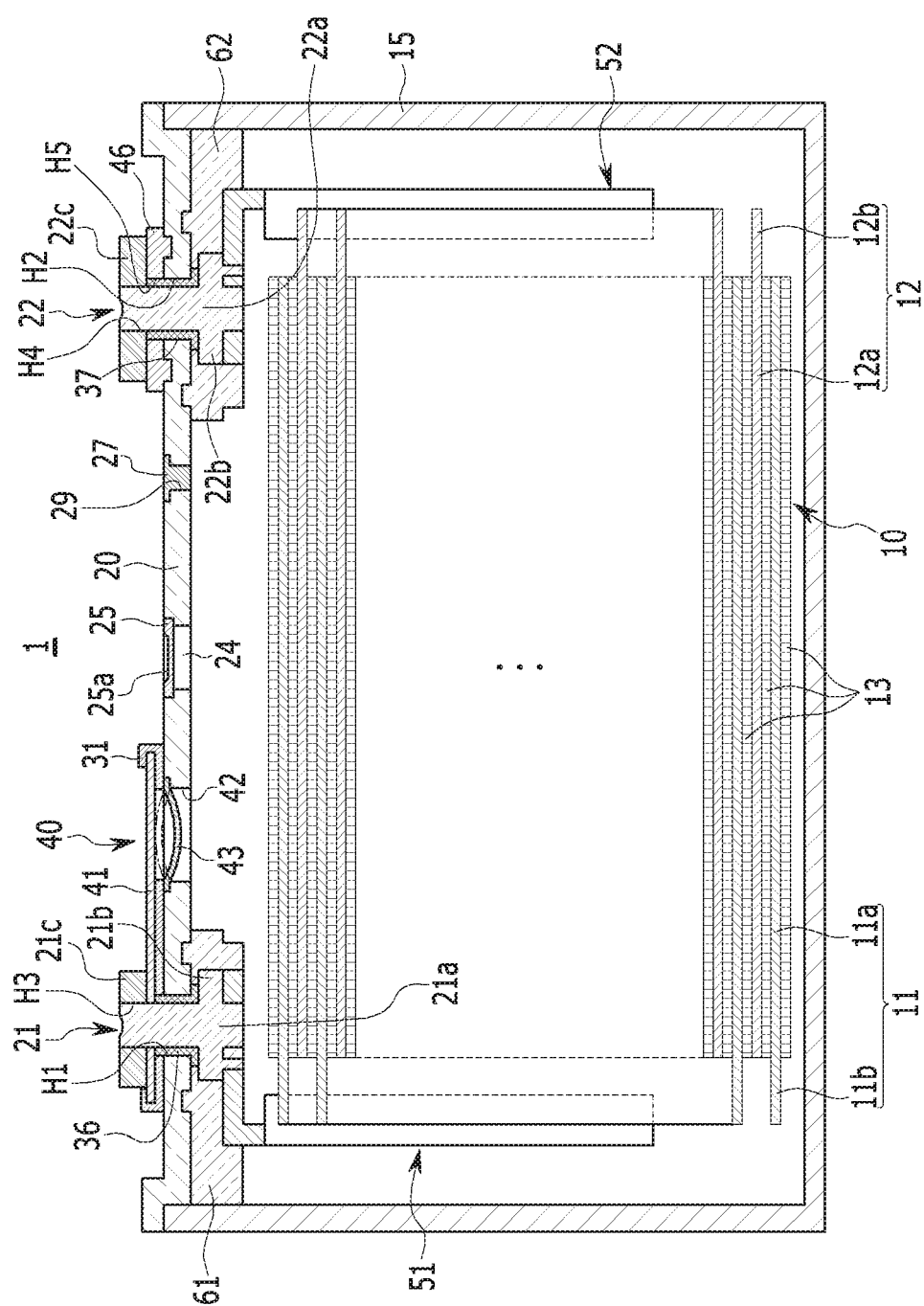
FIG. 2 is a cross-sectional view taken along line II-II in FIG. 1.

FIG. 1 is a perspective view of a rechargeable battery according to a first exemplary embodiment of the present invention, and FIG. 2 is a cross-sectional view taken along line II-II in FIG. 1. Referring to FIGS. 1 and 2, a rechargeable battery 1 according to the first exemplary embodiment includes an electrode assembly 10 which is charged with an electric current and discharged, a casing 15 which accommodates therein the electrode assembly 10, a cap plate 20 which is coupled to an opening of the casing 15, and electrode terminals (negative and positive electrode terminals 21 and 22) which are installed on the cap plate 20.

For example, the electrode assembly 10 is formed by disposing electrodes (negative and positive electrodes 11 and 12) at both sides of a separator 13 which is an insulator, and winding the negative electrode 11, the separator 13, and the positive electrode 12 in a jelly roll state.

The negative electrode 11 and the positive electrode 12 include coated portions 11a and 12a which are formed by applying an active material onto thin metal current collectors, and non-coated portions 11b and 12b which are formed by current collectors onto which no active material is applied such that the current collectors are exposed.

The non-coated portion 11b of the negative electrode 11 is formed at one end of the negative electrode 11 along the wound negative electrode 11. The non-coated portion 12b of the positive electrode 12 is formed at one end of the positive electrode 12 along the wound positive electrode 12. The non-coated portions 11b and 12b are disposed at both ends of the electrode assembly 10, respectively.

For example, the casing 15 has an approximately rectangular parallelepiped internal space so as to define a space that accommodates therein the electrode assembly 10 and an electrolyte. The casing 15 has the opening formed at one side of the rectangular parallelepiped shape to connect the internal space to the outside. The opening enables the electrode assembly 10 to be inserted into the casing 15.

The cap plate 20 is installed in the opening of the casing 15 and seals the opening of the casing 15. For example, the casing 15 and the cap plate 20 are made of aluminum and may be welded together.

In addition, the cap plate 20 has an electrolyte injection port 29, a vent hole 24, and terminal holes H1 and H2. The electrolyte injection port 29 enables the electrolyte to be injected into the casing 15 after the cap plate 20 is coupled to the casing 15. The electrolyte injection port 29 is sealed with a sealing closure 27 after the electrolyte is injected.

The vent hole 24 is sealed with a vent plate 25 so as to discharge internal pressure of the rechargeable battery 1. When the internal pressure of the rechargeable battery 1 reaches a certain pressure, the vent plate 25 is cut along a notch 25a, thereby opening the vent hole 24.

The negative electrode terminal 21 and the positive electrode terminal 22 are installed in the terminal holes H1 and H2 of the cap plate 20, respectively, and electrically connected to the electrode assembly 10 in the casing 15. That is, the negative electrode terminal 21 is electrically connected to the negative electrode 11 of the electrode assembly 10, and the positive electrode terminal 22 is electrically connected to the positive electrode 12 of the electrode assembly 10. Therefore, the electrode assembly 10 extends to the outside of the casing 15 through the negative electrode terminal 21 and the positive electrode terminal 22.

Meanwhile, the rechargeable battery 1 of the first exemplary embodiment has an external short-circuiting unit 40 at a side of the negative electrode terminal 21. Although not illustrated, the rechargeable battery may have no external short-circuiting unit. Hereinafter, the rechargeable battery 1 having the external short-circuiting unit 40 will be described.

Because the negative electrode terminal 21 and the positive electrode terminal 22 may have the same structure inside the cap plate 20, the same structure will be described. However, because the negative electrode terminal 21 and the positive electrode terminal 22 have different structures outside the cap plate 20, the different structures will be described separately.

The negative and positive electrode terminals 21 and 22 include plate terminals 21c and 22c which are disposed outside the cap plate 20 and have coupling holes H3 and H4, and rivet terminals 21a and 22a which are installed in the terminal holes H1 and H2 of the cap plate 20 and coupled to the coupling holes H3 and H4.

In addition, the negative and positive electrode terminals 21 and 22 may further include flanges 21b and 22b which are widely formed integrally with the rivet terminals 21a and 22a inside the cap plate 20. The rivet terminals 21a and 22a are electrically connected to the electrode assembly 10 through the flanges 21b and 22b.

Negative and positive electrode gaskets 36 and 37 are installed between the rivet terminals 21a and 22a and inner surfaces of the terminal holes H1 and H2 of the negative and positive electrode terminals 21 and 22, thereby sealing and electrically insulating portions between the rivet terminals 21a and 22a of the negative and positive electrode terminals 21 and 22 and the cap plate 20.

The negative and positive electrode gaskets 36 and 37 further extend between the flanges 21b and 22b and an inner surface of the cap plate 20, thereby further sealing and electrically insulating portions between the flanges 21b and 22b and the cap plate 20. That is, the negative and positive electrode gaskets 36 and 37 are installed between the cap plate 20 and the negative and positive electrode terminals 21 and 22, thereby preventing the electrolyte from leaking through the terminal holes H1 and H2.

Negative and positive electrode lead tabs 51 and 52 electrically connect the negative and positive electrode terminals 21 and 22 to the negative and positive electrodes 11 and 12 of the electrode assembly 10. That is, the negative and positive electrode lead tabs 51 and 52 are coupled to lower ends of the rivet terminals 21a and 22a, and the lower ends of the rivet terminals 21a and 22a are caulked, such that the negative and positive electrode lead tabs 51 and 52 are supported on the flanges 21b and 22b and connected to the lower ends of the rivet terminals 21a and 22a.

Negative and positive electrode insulating members 61 and 62 are installed between the negative and positive electrode lead tabs 51 and 52 and the cap plate 20, respectively, and electrically insulate the negative and positive electrode lead tabs 51 and 52 and the cap plate 20.

In addition, the negative and positive electrode insulating members 61 and 62 are coupled to the cap plate 20 at one side thereof and surround the negative and positive electrode lead tabs 51 and 52, the rivet terminals 21a and 22a, and the flanges 21b and 22b at the other side thereof, thereby stabilizing connection and coupling structures thereof.

Meanwhile, the external short-circuiting unit 40 will be described regarding the plate terminal 21c of the negative electrode terminal 21, and a top plate 46 will be described regarding the plate terminal 22c of the positive electrode terminal 22.

The external short-circuiting unit 40 at a side of the negative electrode terminal 21 includes a short-circuiting tab 41 and a short-circuiting member 43 which are spaced apart from each other or short-circuited in accordance with internal pressure. The short-circuiting tab 41 is electrically connected to the rivet terminal 21a of the negative electrode terminal 21 and disposed outside the cap plate 20 with an insulating member 31 interposed therebetween.

The insulating member 31 is installed between the short-circuiting tab 41 and the cap plate 20 and electrically insulates the short-circuiting tab 41 and the cap plate 20. That is, a state in which the cap plate 20 is electrically insulated from the negative electrode terminal 21 is maintained.

The short-circuiting tab 41 and the plate terminal 21c are coupled to an upper end of the rivet terminal 21a, and the upper end of the rivet terminal 21a is caulked, such that the short-circuiting tab 41 and the plate terminal 21c are coupled to the upper end of the rivet terminal 21a. Therefore, the short-circuiting tab 41 and the plate terminal 21c are fixed to the cap plate 20 in a state in which the insulating member 31 is interposed therebetween.

Meanwhile, the negative electrode gasket 36 is installed to further extend between the rivet terminal 21a and the insulating member 31. That is, the negative electrode gasket 36 further seals a portion between the rivet terminal 21a and the insulating member 31.

The short-circuiting member 43 is installed in a short-circuiting hole 42 formed in the cap plate 20, thereby sealing the short-circuiting hole 42. The short-circuiting tab 41 is connected to the negative electrode terminal 21 and extends along an outer portion of the short-circuiting member 43.

Therefore, the short-circuiting tab 41 and the short-circuiting member 43 correspond to the short-circuiting hole 42, face each other, and maintain a state (state indicated by a solid line) in which the short-circuiting tab 41 and the short-circuiting member 43 are spaced apart from each other. When the internal pressure of the rechargeable battery 1 is increased, the short-circuiting member 43 is reversed, such that a short-circuited state (state indicated by an imaginary line) may be formed.

The top plate 46 at a side of the positive electrode terminal 22 electrically connects the plate terminal 22c of the positive electrode terminal 22 and the cap plate 20. That is, a state in which the cap plate 20 is electrically connected to the positive electrode terminal 22 is maintained.

For example, the top plate 46 is interposed between the plate terminal 22c and the cap plate 20 to electrically connect the plate terminal 22c and the cap plate 20, and has a through hole H5 so that the rivet terminal 22a penetrates the through hole H5.

Therefore, the top plate 46 and the plate terminal 22c are coupled to an upper end of the rivet terminal 22a, and the upper end of the rivet terminal 22a is caulked, such that the top plate 46 and the plate terminal 22c are coupled to the upper end of the rivet terminal 22a. The plate terminal 22c is installed outside the cap plate 20 with the top plate 46 interposed therebetween.

Meanwhile, the positive electrode gasket 37 is installed to further extend between the rivet terminal 22a and the top plate 46. That is, the positive electrode gasket 37 prevents the rivet terminal 22a and the top plate 46 from being electrically and directly connected to each other. That is, the rivet terminal 22a is electrically connected to the top plate 46 through the plate terminal 22c.

Further, in addition to the structure in which the plate terminals 21c and 22c and the rivet terminals 21a and 22a are coupled to one another by caulking, the rechargeable battery 1 of the first exemplary embodiment further has torque resistance increasing portions provided at coupling interfaces between the coupling holes H3 and H4 and the rivet terminals 21a and 22a.

The torque resistance increasing portions are configured to increase torque resistive force of the plate terminals 21c and 22c with respect to the z-axis of the rivet terminals 21a and 22a. The same structure of the torque resistance increasing portions may be applied to the plate terminals 21c and 22c and the rivet terminals 21a and 22a of the negative and positive electrode terminals 21 and 22.

For convenience, the torque resistance increasing portion will be described with reference to FIGS. 3 to 6, for example, with respect to the positive electrode terminal 22.

FIG. 3 is an exploded perspective view of the electrode terminal of the rechargeable battery in FIG. 1, and FIG. 4 is a perspective view of the rivet terminal of the electrode terminal in FIG. 3. Referring to FIGS. 3 and 4, the rivet terminal 22a includes a first corresponding portion 221 and a second corresponding portion 222 which are coupled to the plate terminal 22c and defined depending on positions in the z-axis direction.

The first corresponding portion 221 is coupled, in an insulated state, to the terminal hole H2 with the positive electrode gasket 37 interposed therebetween so as to seal the terminal hole H2, and the second corresponding portion 222 is connected to the first corresponding portion 221 in the z-axis direction and coupled, in a conductive state, to the coupling hole H4.

In this case, torque resistance increasing portions T increase torque resistive force of the plate terminal 22c with respect to the z-axis of the second corresponding portion 222. That is, coupling force between the rivet terminal 22a and the plate terminal 22c is increased as a mechanical contact area therebetween is increased.

FIG. 5 is a top plan view illustrating the assembled electrode terminal in FIG. 3, and FIG. 6 is a cross-sectional view taken along line VI-VI in FIG. 5.

Referring to FIGS. 3 to 6, the torque resistance increasing portions T include a knurled portion 223 which is formed on an outer surface of the second corresponding portion 222, and a deformed portion 224 which is formed on an inner surface of the coupling hole H4 so as to correspond to the knurled portion 223 of the second corresponding portion 222.

In FIG. 4, since the coupling hole H4 of the plate terminal 22c is deformed by being coupled to the knurled portion 223, the coupling hole H4 does not have the deformed portion 224. As illustrated in FIGS. 5 and 6, the deformed portion 224 is formed as the knurled portion 223 is coupled to the coupling hole H4.

The knurled portion 223 includes crests 231 and troughs 232 which are disposed repeatedly on an outer circumferential surface of the second corresponding portion 222 in a circumferential direction and extend in the z-axis direction.

The deformed portion 224 includes deformed troughs 241 and deformed crests 242 which are formed to correspond to the crests 231 and the troughs 232 of the knurled portion 223. The deformed troughs 241 and the deformed crests 242, which are formed as the knurled portion 223 is coupled to the coupling hole H4, are repeatedly deformed and disposed on the inner surface of the coupling hole H4 in the circumferential direction and extend in the z-axis direction.

Gaps G may be formed between the knurled portion 223 and the deformed portion 224 by an outer diameter of the knurled portion 223. That is, when the deformed crests 242 are coincident with the inner surface of the coupling hole H4, the gaps G are provided between the deformed crests 242 and the troughs 232, thereby absorbing thermal deformation occurring between the rivet terminal 22a and the plate terminal 22c.

The second corresponding portion 222 has a constant diameter in the entire region in the z-axis direction. Strength of the rivet terminal 22a is higher than strength of the plate terminal 22c. That is, strength of the second corresponding portion 222 is higher than strength of the coupling hole H4 of the plate terminal 22c.

Therefore, when the knurled portion 223 of the second corresponding portion 222 is inserted into the coupling hole H4 of the plate terminal 22c, the deformed portion 224 is formed on the inner surface of the coupling hole H4 by the crests 231 and the troughs 232 of the knurled portion 223, such that the second corresponding portion 222 and the plate terminal 22c may be securely coupled to each other.

Since the crests 231 and the troughs 232 of the knurled portion 223 extend in the z-axis direction and are coupled to the deformed troughs 241 and the deformed crests 242 formed in the coupling hole H4 as the knurled portion 223 is inserted into the coupling hole H4, the plate terminal 22c having the deformed portion 224 has high resistive force against z-axis torque.

Further, the coupling between the knurled portion 223 and the deformed portion 224 allows a large area defined by the crests 231 and the troughs 232 and a large area defined by the deformed troughs 241 and the deformed crests 242 to be in contact with each other. Therefore, a contact area between the plate terminal 22c and the rivet terminal 22a is increased, such that mutual electrical contact resistance may be decreased.

Further, the structure for coupling the knurled portion 223 and the deformed portion 224 inhibits thermal deformation caused by shrinkage and expansion occurring due to a thermal shock. Therefore, electrical resistance dispersion may be reduced during the normal operation in comparison with electrical resistance in the event of a thermal shock.

Hereinafter, various exemplary embodiments of the present invention will be described. Descriptions of the configurations of the various exemplary embodiments, which are the same as the configurations in the first exemplary embodiment and the aforementioned exemplary embodiments, will be omitted, but the different configurations will be described.

FIG. 7 is a cross-sectional view of an electrode terminal of a rechargeable battery according to a second exemplary embodiment of the present invention, and FIG. 8 is a perspective view of a rivet terminal of the electrode terminal in FIG. 7.

Referring to FIGS. 7 and 8, in a rechargeable battery 2 of a second exemplary embodiment, a second corresponding portion 777 of a positive electrode terminal 72 has a minimum diameter at an inner side thereof in the z-axis direction of the cap plate 20, the diameter of the second corresponding portion 777 is gradually increased outward, and the second corresponding portion 777 has a maximum diameter at an outer side thereof.

Torque resistance increasing portions T2 include a knurled portion 773 which is formed on an outer surface of the second corresponding portion 777, and a deformed portion 774 which is formed on an inner surface of a coupling hole H24 so as to correspond to the knurled portion 773 of the second corresponding portion 777.

The knurled portion 773 includes crests 771 and troughs 772 which are disposed repeatedly on an outer circumferential surface of the second corresponding portion 777 in a circumferential direction, extend in the z-axis direction, and incline at a predetermined angle θ.

The deformed portion 774 includes deformed troughs 781 and the deformed crests 782 which are deformed corresponding to the crests 771 and the troughs 772 of the knurled portion 773. The deformed troughs 781 and the deformed crests 782, which are formed as the knurled portion 773 is coupled to the coupling hole H24, are repeatedly deformed and disposed on the inner surface of the coupling hole H24 in the circumferential direction, extend in the z-axis direction, and incline at the predetermined angle θ.

Gaps G12 may be formed between the knurled portion 773 and the deformed portion 774 by an outer diameter of the knurled portion 773. That is, when the deformed crests 782 are coincident with the inner surface of the coupling hole H24, the gaps G12 are provided between the deformed crests 782 and the troughs 772, thereby absorbing thermal deformation occurring between a rivet terminal 72a and a plate terminal 72c.

The second corresponding portion 777 has a minimum diameter at an inner side thereof in the z-axis direction, the diameter of the second corresponding portion 777 is gradually increased outward, and the second corresponding portion 777 has a maximum diameter at an outer side thereof. Therefore, when the knurled portion 773 of the second corresponding portion 777 is inserted into the coupling hole H24 of the plate terminal 72c, the deformed portion 774 is formed on the inner surface of the coupling hole H24, such that the second corresponding portion 777 and the plate terminal 72c are securely coupled to each other.

Gaps G2 may be formed between the knurled portion 773 and the deformed portion 774 inside the knurled portion 773 by a maximum outer diameter of the knurled portion 773. That is, the gaps G2 are provided between the deformed troughs 781 and the crests 771, thereby further absorbing thermal deformation occurring between the rivet terminal 72a and the plate terminal 72c.

Further, since the structure for coupling the knurled portion 773 and the deformed portion 774 has the gaps G12 and the gaps G2, thermal deformation caused by shrinkage and expansion occurring due to a thermal shock is further absorbed and inhibited. Therefore, electrical resistance dispersion may further be reduced during the normal operation in comparison with electrical resistance in the event of a thermal shock.

FIG. 9 is a cross-sectional view of an electrode terminal of a rechargeable battery according to a third exemplary embodiment of the present invention, and FIG. 10 is a perspective view of a rivet terminal of the electrode terminal in FIG. 9.

Referring to FIGS. 9 and 10, in a rechargeable battery 3 of a third exemplary embodiment, torque resistance increasing portions T3 of an electrode terminal 82 include a knurled portion 883 which are formed on an outer surface of a second corresponding portion 888, and a deformed portion 884 which are formed on an inner surface of a coupling hole H34 so as to correspond to the knurled portion 883 of the second corresponding portion 888.

The knurled portion 883 includes first troughs 872 which are repeatedly disposed on an outer circumferential surface of the second corresponding portion 888 in a circumferential direction and extend in the z-axis direction, second troughs 874 which intersect the first troughs 872, and protrusions 871 which are formed between the first and second troughs 872 and 874. The second troughs 874 are repeatedly disposed on the outer circumferential surface of the second corresponding portion 888 in the z-axis direction and formed in the circumferential direction.

The deformed portion 884 includes deformed troughs 891 and deformed crests 892. The deformed troughs 891 and the deformed crests 892 are deformed corresponding to the protrusions 871 and the first and second troughs 872 and 874 of the knurled portion 883. The deformed troughs 891 are repeatedly deformed and disposed on the inner surface of the coupling hole H34 in the circumferential direction and extend in the z-axis direction, and the deformed troughs 891 are repeatedly deformed and disposed in the z-axis direction and formed in the circumferential direction. The deformed crests 892 are formed between the deformed troughs 891 that intersect one another.

Gaps G3 may be formed between the knurled portion 883 and the deformed portion 884 by an outer diameter of the knurled portion 883. That is, when the deformed crests 892 are coincident with the inner surface of the coupling hole H34, the gaps G3 are provided between the deformed crests 892 and the first and second troughs 872 and 874, thereby absorbing thermal deformation occurring between a rivet terminal 82a and a plate terminal 82c.

The second corresponding portion 888 may have a constant diameter in the entire region in the z-axis direction. In this case, in the knurled portion 883, the first troughs 872 and the second troughs 874 intersect each other between the protrusions 871. Therefore, the protrusions 871 are formed as multiple quadrangular pyramids on an outer surface of the second corresponding portion 888.

In the second corresponding portion 888, the knurled portion 883 including the quadrangular pyramidal protrusions 871 has corresponding grooves formed in the inner surface of the coupling hole H34 to correspond to the quadrangular pyramids. The plate terminal 82c having the deformed portion 884 has higher resistive force against the z-axis torque of the rivet terminal 82a.

In addition, the coupling between the knurled portion 883 and the deformed portion 884 allows a large area defined by the protrusions 871 and the first and second troughs 872 and 874 and a large area defined by the deformed troughs 891 and the deformed crests 892 to be in contact with each other. Therefore, a contact area between the plate terminal 82c and the rivet terminal 82a is increased, such that mutual electrical contact resistance may be decreased.

Further, the structure for coupling the knurled portion 883 and the deformed portion 884 inhibits thermal deformation caused by shrinkage and expansion occurring due to a thermal shock. Therefore, electrical resistance dispersion may be reduced during the normal operation in comparison with electrical resistance in the event of a thermal shock.

While this invention has been described in connection with what are presently considered to be some practical exemplary embodiments, it is to be understood that the invention is not limited to the disclosed embodiments, but, on the contrary, is intended to cover various modifications and equivalent arrangements included within the scope of the appended claims.

DESCRIPTION OF SYMBOLS

| | |
|---|---|
| 10: Electrode assembly | |
| 11, 12: Electrode (negative and positive electrodes) | |
| 11a, 12a: Coated portion | |
| 11b, 12b: Non-coated portion | 13: Separator |
| 15: Casing | 20: Cap plate |
| 21, 22: Electrode terminal (negative and positive electrode terminals) | |
| 21c, 22c, 72c, 82c: Plate terminal | |
| 21a, 22a, 72a, 82a: Rivet terminal | 21b, 22b: Flange |
| 24: Vent hole | 25: Vent plate |
| 25a: Notch | 27: Sealing closure |
| 29: Electrolyte injection port | 31: Insulating member |
| 36, 37: Negative and positive electrode gaskets | |
| 40: External short-circuiting unit | |
| 41: Short-circuiting tab | 43: Short-circuiting member |
| 46: Top plate | |
| 51, 52: Negative and positive electrode lead tabs | |
| 72, 82: Positive electrode terminal | 221: First corresponding portion |
| 222, 777, 888: Second corresponding portion | |
| 223, 773, 883: Knurled portion | |
| 224, 774, 884: Deformed portion | 231, 771: Crest |
| 232, 772: Trough | 241, 781: Deformed trough |
| 242, 782: Deformed crest | |
| 871: Protrusion | 872, 874: First and second troughs |
| 891: Deformed trough | 892: Deformed crest |
| G, G2, G12, G3: Gap | H1, H2: Terminal hole |
| H3, H4, H24, H34: Coupling hole | H5: Through hole |
| T, T2, T3: Torque resistance increasing portion | |

The invention claimed is:

1. A rechargeable battery comprising:
an electrode assembly which is chargeable with an electric current and dischargeable;
a casing which accommodates therein the electrode assembly;
a cap plate which is coupled to an opening of the casing; and
an electrode terminal which is electrically connected to the electrode assembly and installed in a terminal hole of the cap plate,
wherein the electrode terminal includes:
a plate terminal which is outside the cap plate and has a coupling hole; and
a rivet terminal which is installed in the terminal hole and coupled to the coupling hole, and
the plate terminal and the rivet terminal include torque resistance increasing portions which are at a coupling interface between the coupling hole and the rivet terminal and increase torque resistive force of the plate terminal with respect to a z-axis direction of the rivet terminal, the z-axis direction being a direction in which the rivet terminal passes through the terminal hole, and the torque resistance increasing portions comprising first troughs linearly extending on the rivet terminal.

2. The rechargeable battery of claim 1, wherein:
the rivet terminal includes:
a first corresponding portion which is coupled, in an insulated state, to the terminal hole with a gasket therebetween; and
a second corresponding portion which is connected to the first corresponding portion in the z-axis direction and coupled, in a conductive state, to the coupling hole.

3. The rechargeable battery of claim 2, wherein:
the torque resistance increasing portions include:
a knurled portion which is on an outer surface of the second corresponding portion; and
a deformed portion which is on an inner surface of the coupling hole so as to correspond to the knurled portion of the second corresponding portion.

4. The rechargeable battery of claim 3, wherein:
the knurled portion includes crests and the first troughs which are repeatedly arranged on an outer circumferential surface of the second corresponding portion in a circumferential direction and extend in the z-axis direction.

5. The rechargeable battery of claim 4, wherein:
the deformed portion includes deformed troughs and deformed crests which are deformed corresponding to the crests and the first troughs of the knurled portion, are repeatedly deformed and arranged on an inner surface of the coupling hole in the circumferential direction, and extend in the z-axis direction.

6. The rechargeable battery of claim 4, wherein:
the second corresponding portion has a constant diameter in an entire region in the z-axis direction.

7. The rechargeable battery of claim 4, wherein:
the second corresponding portion has a minimum diameter at an inner side thereof in the z-axis direction, the diameter of the second corresponding portion gradually increases outward, and the second corresponding portion has a maximum diameter at an outer side thereof.

8. The rechargeable battery of claim 3, wherein:
the knurled portion includes:
the first troughs which are repeatedly arranged on an outer circumferential surface of the second corresponding portion in a circumferential direction and extend in the z-axis direction;
second troughs which are repeatedly arranged on the outer circumferential surface of the second corresponding portion in the z-axis direction and formed in the circumferential direction, and intersect the first troughs; and
protrusions which are between the first troughs and the second troughs.

9. The rechargeable battery of claim 8, wherein:
the deformed portion includes:
deformed troughs which are deformed corresponding to the protrusions, the first troughs, and the second troughs of the knurled portion, repeatedly deformed and arranged on an inner surface of the coupling hole in the circumferential direction, extended in the z-axis direction, repeatedly deformed and arranged in the z-axis direction and formed in the circumferential direction; and
deformed crests which are between the deformed troughs that intersect one another.

10. The rechargeable battery of claim 8, wherein:
the second corresponding portion has a constant diameter in an entire region in the z-axis direction.

11. The rechargeable battery of claim 9, wherein:
the protrusions are arranged as multiple quadrangular pyramids on the outer surface of the second corresponding portion by the first troughs and the second troughs that intersect the first troughs.

12. The rechargeable battery of claim 1, wherein:
a strength of the rivet terminal is higher than a strength of the plate terminal.

\* \* \* \* \*